United States Patent Office 3,841,993
Patented Oct. 15, 1974

3,841,993
RETORTING OF OIL SHALE WITH SPECIAL HEAT CARRIERS
Donald K. Wunderlich and James L. Skinner, Richardson, Tex., assignors to Atlantic Richfield Company, Los Angeles, Calif.
Continuation-in-part of application Ser. No. 287,669, Sept. 11, 1972, which is a continuation-in-part of application Ser. No. 284,288, Aug. 29, 1972, both now abandoned.
This application Oct. 26, 1973, Ser. No. 409,957
Int. Cl. C10b 53/06
U.S. Cl. 208—11     25 Claims

ABSTRACT OF THE DISCLOSURE

Hot special solid heat carriers comprised of a mixture of low internal surface area heat bodies and relatively high internal surface area pellets are cycled to a retort zone to retort crushed oil shale thereby producing gas and oil products, particulate spent shale, and a combustible deposition on the pellets. The combustible deposition on the pellets provides the main source of heat for heating the heat carriers thereby increasing the utility of the carbon-containing residue normally formed during retorting. The pellets carry sensible heat to the retort zone, improve the quality of the liquid products, and collect the combustible deposition. The low surface area heat bodies carry sensible heat, coact with the pellets to regulate the effective surface area and quantity of the heat carriers relative to the oil shale, and provide greater operating flexibility to the retorting process. In an oil shale processing operation, the overall result is an increase in liquid oil yield. After retorting, the heat carriers are separated from at least 95 percent by weight of the spent shale smaller than the heat carriers. The heat carriers are then passed or lifted to a combustion zone where the combustible deposition on the pellets is burned to reheat the heat carriers.

CROSS-REFERENCES TO RELATED APPLICATIONS

This application is a continuation-in-part of copending application Ser. No. 287,669, filed Sept 11, 1972, entitled "Retorting Oil Shale with Special Heat Carriers," now abandoned, which was a continuation-in-part of copending application Ser. No. 284,288, filed Aug. 28, 1972, now abandoned, entitled "Retorting Oil Shale with Special Pellets," by the same inventors as this application and owned by a common assignee.

BACKGROUND OF THE INVENTION

This invention relates to a process for retorting of the solid carbonaceous organic matter in crushed oil shale. In this process, special heat carriers comprised of low internal surface area heat bodies and relatively high internal surface area pellets are cycled through a retorting system.

As a preliminary stage in the production of petroleum oils and gases, the solid carbonaceous organic solid matter or kerogen in oil shale is pyrolyzed or retorted. The term retorting denotes thermal conversion of kerogen or organic matter to oil vapors and gas thereby leaving particulate spent shale and includes separation of the oil vapors and gas from the spent shale. The spent shale contains residual carbonaceous organic matter and matrix mineral matter. In an overall commercial operation, the products or yield of retorting are processed in additional stages, for example, solids separation, condensation, fractionation, coking, hydrogenation, and the like, depending on the types of marketable products being produced.

Frequently, the yields of various processes are compared with Fischer Assay yields. For a description of the Fischer Assay refer to "Method of Assaying Oil Shale by a Modified Fischer Retort" by K. E. Stanfield and I. C. Frost, R. I. 4477, June 1949, U.S. Department of Interior.

When the kerogen is retorted, a normally gaseous fraction, a normally liquefiable vaporous fraction, and an organic residue are formed. The product distribution between gas, liquid, and residue is indicative of the distribution of the various boiling point fractions in the liquid product. It is highly desirable to obtain a liquid product that is directly adaptable to prerefining and avoids or lessens the amount of residue or 975° F. plus fraction that must be subjected to coking or other similar treatments. In many retorting processes control over the product distribution is virtually absent, and in others, any attempt to reduce the need for coking and the like by altering the boiling point distribution in the liquids either results in too much unusable material, or too much gas product, or too much organic residue or 975° F. plus fraction, or any combination thereof, which in turn eventually result in a loss of liquid oil yield. Any advantage obtained by attempting to control product or residue conversion is frequently offset by undesirable shifts in other process variables or results. In addition, the kerogen content of the oil shale inherently or naturally fluctuates between rich and lean and many processes are not sufficiently flexible to control product distribution when the kerogen contact varies.

Some advances to more flexible and efficient control over the products of retorting and of other process variables have been made by using solid heat-carrying bodies which exhibit good heat transfer properties and supply the heat needed for retorting with a reduction in process problems. In such processes, the heat-carrying bodies and the oil shale feedstock are intermixed thereby retorting oil vapors and gases from the feedstock. The heat-carrying bodies are usually heated in a separate heating zone by burning combustible fuel material, such as heavy resid or natural gas. But in general, this method of heating necessitates additional equipment and creates additional handling problems.

Others have proposed cycling the spent shale and supplying some of the heat by burning the residual carbonaceous organic matter or solid organic char developed in the retort zone, or cycling catalyst particles and supplying some of the heat by burning carbon deposited on the catalyst (for example, U.S. Pat. 3,281,349). In this latter process, the surface area of the catalyst particles is not specified. Some types of catalyst particles frequently have high surface areas which result in loss of valuable liquid product and excessive gaseous product, excessive residue, excessive heating of the catalyst during burning, loss of valuable heat values, higher oxygen demands, and other disadvantages.

In addition, a large amount of fine (e.g. minus 14 U.S. Standard Sieve size) particulate spent shale is usually present during burning and reheating. This spent shale contains organic carbon and increases oxygen demands, causes loss of useful heat values, and adversely enlarges the size of equipment. Fine spent shale or other materials also interfere with control of the burning and other stages of the process and create many other problems especially when the entrained spent shale is smaller than other heat-carrying bodies. Moreover, the presence of appreciable amounts of fine spent shale severely limits the type of equipment which can be used for burning the residue. Generally, burning in the presence of fine spent shale requires the use of lift pipes. If air is used for lifting, the burning could entail a large excess of oxygen which would rapidly burn the organic matter and create disadvantages in the process of this invention.

Copending application Ser. No. 410,200, which is a continuation-in-part of application 284,288, and which is incorporated herein, provides a process for retorting oil shale using hot special pellets as a retorting media in a way which regulates the amount of combustible organic carbon residue or deposition formed on the pellets during retorting of oil shale and improves the recovery of useful components and liquid product distribution. The deposition acts as a principal source of fuel for heating the pellets, and the sensible heat in the pellets is used to retort the oil shale. The process relies on the interrelation between the surface area of the pellets and other conditions and variables; however, additional flexibility in the operation of the process, especially the retort zone, is desired primarily because it has been found that the retorting stage of the process requires constant control and adjustment. There also arises occasions when the objectives or conditions of the retorting process change or fluctuate and more process flexibility is advantageous. For example, the richness of the raw oil shale will vary with time, or it may be desirable to use higher internal surface area pellets and to make allowance for surface area changes as the pellets are cycled. At other times, a change in heat capacity of the retorting media may be desirable. Briefly, therefore, a principal object of this invention is to provide greater flexibility to a retorting process of the type disclosed in copending application Ser. No. 410,200 filed Oct. 26, 1973.

SUMMARY OF THE INVENTION

Figure 1:
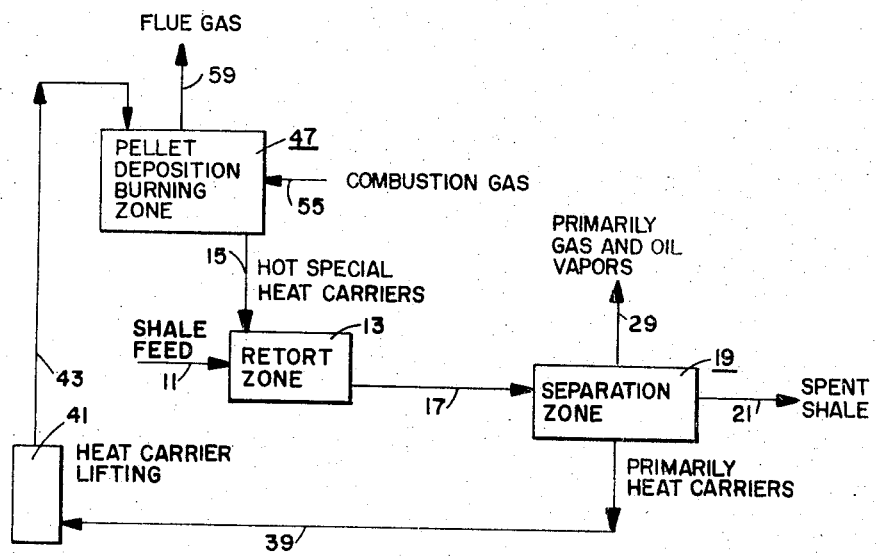
FIG. 1 is a schematic flowsheet of the process of this invention.

In a retorting process, crushed carbonaceous solid organic matter is retorted in a retort zone with hot special heat carriers in a manner which produces product gases and oil vapors, combustible deposition, and particulate spent shale. The primary objectives of the process are to improve product quality and the product yield of an overall commercial oil shale process, to reduce the need for gaseous or liquid fuels which are normally required in the production of syncrude from solid carbonaceous materials, and to avoid waste of valuable organic residue. The process cycles special heat carriers in a size range between about 0.055 inch and 0.5 inch and preferably between 0.055 and 0.375 inch, and comprised of a mixture of low internal surface area heat bodies and relatively high internal surface area pellets. The heat carriers contain between 10 and 90 percent by weight of the heat bodies and between 90 and 10 percent by weight of the pellets. The physical properties and characteristics, especially surface area, size, shape, temperature, and amount, of the heat carriers coact with other variables to produce a regulated amount of a combustible carbon-containing deposition on the pellets. This renders the deposition on the pellets more useful as a fuel for heating the heat carriers. In the process, some or all of this deposition on the pellets is burned in a pellet combustible deposition burning zone after the heat carriers have been separated from the spent shale to heat and reheat the heat carriers. The pellets have a surface area at least as great as 20 square meters per gram of pellets. The low surface area heat bodies have a surface area less than 0.1 square meters per gram, and increase the heat capacity or sensible heat of the heat carriers and coact with the pellets to regulate the effective surface area and quantity of the heat carriers relative to the oil shale. The low surface area heat bodies, therefore, provide greater flexibility to the retorting process. The combined average surface area of the heat bodies and pellets in the heat carriers is between 10 and 150 square meters per gram.

In the process, mined oil shale which contains solid carbonaceous organic matter and other mineral matter and which has been crushed and may have been preheated is pyrolyzed or retorted in a retort zone with the hot special heat carriers at a temperature and in an amount sufficient to provide at least 50 percent of the sensible heat required to retort the oil shale. Retorting the shale produces gas and oil products which are recovered and particulate spent shale. Retorting also tends to deposit the combustible carbon-containing deposition on the pellet portion of the heat carriers. Preferably, the amount of combustible deposition formed on the pellet portion upon passage through the retort zone is on an average less than 1.5 percent by weight of the heat carriers.

After retorting the oil shale, preferably, at least 75 percent of the total particulate spent shale and at least 95 percent of the particulate spent shale smaller than the heat carriers are separated from the heat carriers. This separation is performed before the buning of the combustible deposition on the pellets. Preburn separation avoids the problems caused by the presence of fine matter during burning. One way to accomplish this sparation is to first screen large spent shale and agglomerates from the heat carriers and thereafter subject the heat carriers and spent shale to gas elutriation with a noncombustion supporting gas. A way to enhance the degree of total separation is to control the spericity factor of the heat carriers to at least 0.9, or to crush the raw oil shale to a smaller than normal size, that is, to minus 6 U.S. Sieve Series size.

After separation of the spent shale, the heat carriers are passed to a pellet deposition burning zone where at least a portion of the deposition on the pellets is burned to reheat the heat carriers.

DETAILED DESCRIPTION OF THE INVENTION

Figure 2:
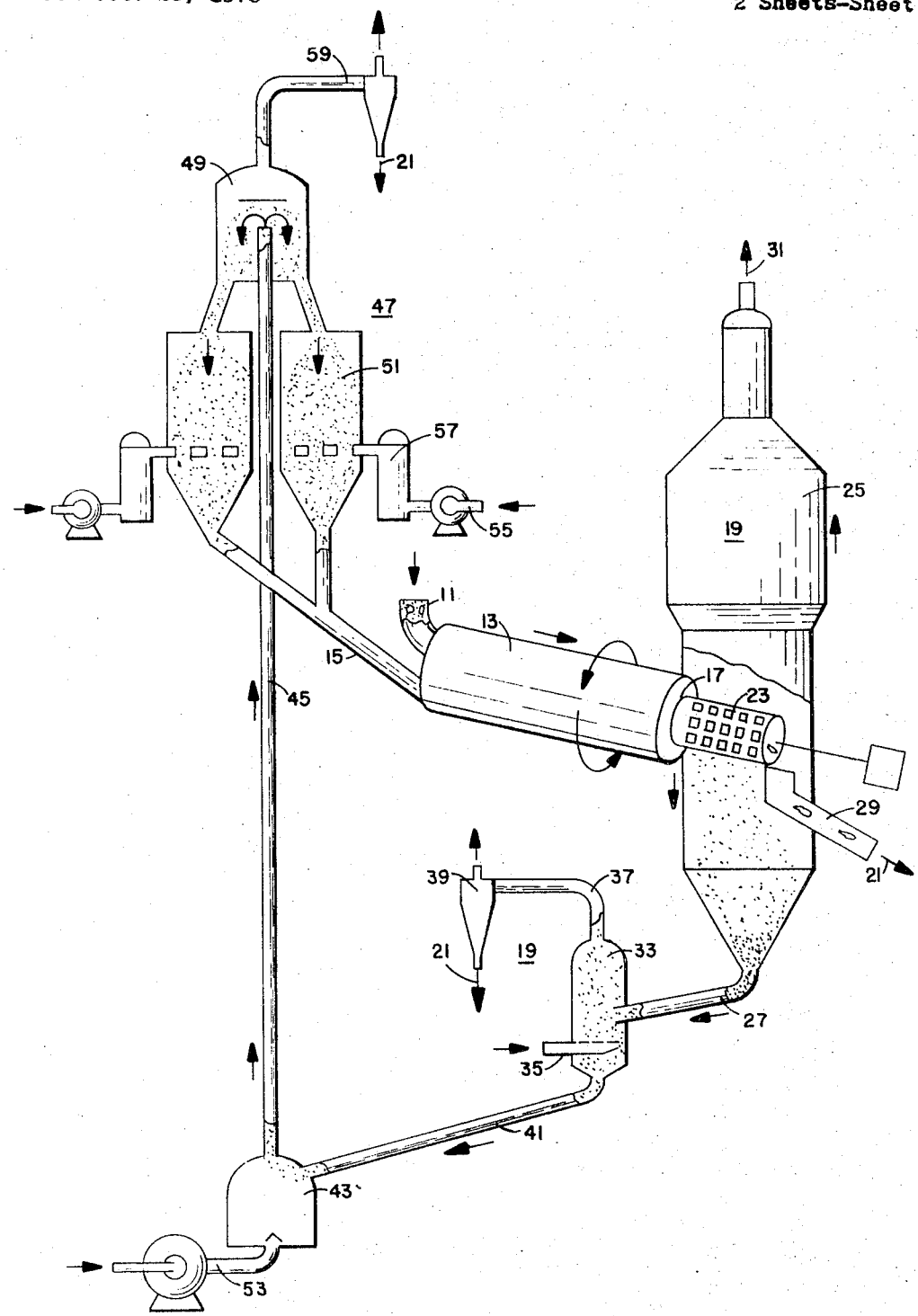
FIG. 2 is a partly schematical, partly diagrammatical flow illustration of a system for carrying out a preferred sequence of the process of FIG. 1.

The process for retorting of crushed oil shale containing carbonaceous organic matter and other mineral matter is described in general terms having reference to FIG. 1 and in more particular terms by reference to FIG. 2.

Raw or fresh oil shale which has been mined and pulverized, crushed or ground for the most part to a predetermined maximum size for handling in a retorting system by any suitable particle diminution process is fed directly from a crusher or from a hopper or accumulator by way of shale inlet line 11 into rotating retort zone 13. At the same time, a special mixture of heat carriers comprised of high surface area pellets and low surface area bodies substantially hotter than the shale feed are fed by gravity or other mechanical means to the retort zone by way of retort inlet pipe 15. The heat carriers and shale feedstock could be fed to the retort zone by way of a comon retort zone inlet.

For purposes of this invention, any spent shale or residual oil shale material cycled with the heat carriers is not considered as being a part of the heat carriers.

Crushing of the raw mined shale expedites more uniform contact and heat transfer between the shale feedstock and hot heat carriers. In normal practice, the degree of crushing is simply dictated by an economic balance between the cost of crushing and the advantages to be gained by crushing when retorting the kerogen from the shale. Generally the shale feedstock is crushed to about out-half inch and no particular care is taken to produce or restrict production of finer material. In this process, crushing has a special purpose and aids in a preburn separation step. In one embodiment for reasons which will be hereinafter shown and despite the added costs and standard practice, the mined shale is crushed to a substantially finer size wherein at least 95 percent by weight of the crushed oil shale will pass through a U.S. Sieve Series size 6 screen.

The crushed oil shale may or may not be preheated by direct or indirect heat from any source including indirect heat exchange with heat carriers or flue gases generated during this retorting process. If the shale feedstock is preheated, the temperature of the feedstock will not exceed 600° F. The shale feedstock will usually be fed by way of a metered weight controller system for reasons hereinafter made apparent and which may include a preheat and/or gas lift system. The preferred system for preheating the raw shale is to lift the shale in lift pipes with the hot flue gases generated in the combustion phase of the process.

The hot special heat carriers are comprised of a mixture of particulate heat bodies and pellets. The mixture contains at least between 10 and 90 percent by weight of heat bodies and between 90 and 10 percent by weight of pellets and are especially characterized by having a size during use of between approximately about 0.055 inch and 0.5 inch and preferably between 0.055 inch and 0.375 inch, and a combined average surface area of the pellets and bodies in the heat carriers during use of between 10 and 150 square meters per gram. The surface area is the average effective surface area upon entry into the retort zone. The surface area may be determined by the conventional nitrogen absorption method. In one embodiment of the process of this invention, the surface area of the heat carriers on a gram basis is between 10 and 100 square meters. The importance of surface area is hereinafter discussed in detail. The heat carriers are at a temperature ranging between 1000° F. and 1400° F. which is about 100° F. to 500° F. higher than the designed retort temperature within the retort zone. The most favorable practical temperature range depends on the process variables and more particularly on the specific advantages and characteristics of this process. The quantity of heat carriers is controlled to coact with other variables so that carrier-to-shale feedstock ratio on a weight basis is preferably between one and three with a ratio between 1.5 and 2.5 being more preferred. This ratio is, moreover, such that that sensible heat in the heat carriers is sufficient to provide at least 50 percent of the heat required to heat the shale feedstock from its feed temperature to the designed retort temperature. The feedstock feed temperature is the temperature of the oil shale after preheating, that is, the temperature of the shale upon entry into the retorting zone. The average retort temperature ranges between about 850° F. and 1200° F. depending on the nature of the shale feedstock, the heat carrier-to-shale ratio, the type of product distribution desired, and heat losses. The relative mass and size of the heat carriers are selected in a manner hereinafter set forth which facilitates separation of the heat carriers from spent shale, controls the amount of combustible residue deposited on the pellet portion of the heat carriers, optimizes other facets of the retorting process, and makes allowance for wear or size reduction of these pellets as they are cycled and recycled through the retorting process.

Heat carriers are subdivided or particulate solids. A majority of these solids have the characteristics and properties herein required and are composed of the same or dissimilar materials having sufficient strength and of irregular shape, cylindrical shape, approximately oval or spherical shape, or purely spherical shape. The preferred heat carriers have a sphericity factor of at least 0.9 which, in addition to the usual advantages of facilitating movement of the heat carriers through the retorting process and of providing optimum solid-to-solid heat transfer and contact between the heat carriers and oil shale feedstock, has an advantage particularly useful in separating the heat carriers from other solids produced in the process as hereinafter set forth. The sphericity factor is the external or geometric surface area of a sphere having the same volume as the heat carrier particle divided by the external surface area of the heat carrier particle.

The pellets in the pellet portion of the heat carriers are made up of materials, such as, alumina or silica alumina, which are not consumed in the process and which are subdivided or particulate matter having significantly high internal surface area. The low surface area bodies of the heat carriers are made up of materials other than spent shale, such as, quartz, beads, silicon carbide, zirconia, sand, and the like, which are not consumed in the process and which are subdivided or particulate matter having no practical or significant internal surface area. The heat carriers are sufficiently wear or breakage resistant and heat resistant to maintain their physical characteristics under the conditions employed in the process, to effect retorting of the oil shale, and to permit controlled burning of a carbon-containing deposition formed on the pellets during such retorting. More specifically, the heat carriers do not disintegrate or decompose, melt or fuse. The pellets, moreover, do not undergo excessive surface area reduction at the temperatures encountered during such burning and the thermal stresses inherent in the process. The heat carriers will, of course, undergo some gradual wear or size reduction.

As will be shown, the size of the heat carriers is related to the other variables and to the preburn separation step to the other variables and to the preburn separation step in a size range between about 0.1 inch and 0.5 inch and preferably between 0.1 inch and 0.375 inch, and will for the most part be maintained during use at a plus 14 U.S. Sieve Series Screen size, that is, approximately about 0.055 inch or greater. Finer heat carrier grain sizes are undesirable in the process of this invention.

The retort zone is any sort of retort system which causes intimate contact or mixing of the crushed oil shale and heat carriers. The preferred retort is any sort of horizontal or inclined retorting drum that causes the oil shale and heat carriers to undergo a tumbling action. This sort of retort is herein referred to as a rotating retort zone. This type of retort zone is quite flexible over a wide range of conditions and more specifically has the advantages of causing rapid solid-to-solid heat exchange between the heat carriers and shale feedstock thereby flashing and pyrolyzing the oil and gas vapors from the shale in a way which allows the vapors to separate from the solids without passing up through a long bed of solids and which minimizes dilution of the product vapors by extraneous undesirable retorting gases; of allowing for a high shale throughput rate at high yields for a given retort volume; of providing for greater control over residence time; of aiding in preventing overcoking and agglomeration of the heat carriers and shale; of facilitating formation of a more uniform controlled amount of combustible carbon-containing residue on the surface area of the pellets in the heat carriers; and of causing flow of the heat carriers and shale through the retort zone in a manner which aids in eventual separation of the heat carriers from the spent shale. The amount of deposition deposited on the pellets in the heat carriers is an important feature of this process and will be discussed later in more detail. The retorting process is carried out in concurrent or parallel flow fashion with the hot heat carriers and the raw shale feedstock being fed into the same end of the retort. The retort zone may be maintained under any pressure which does not hamper efficient operation of the retort, interfere with production of valuable retort vapors, or cause excessive deposition of residue on the pellets in the heat carriers. Generally, pressurization of the pyrolysis or retort zone causes considerable difficulties especially if a rotating retort zone is used. The pressure employed is, therefore, generally the autogenous pressure.

In the retort zone, the hotter heat carriers and cooler crushed shale feedstock are admixed and intimately contacted almost immediately upon being charged into retort zone 13. The shale particles are rapidly heated by sensible heat transfer from the heat carriers to the shale. Any water in the shale is distilled and the kerogen or carbonaceous matter in the shale is decomposed, distilled, and cracked into gaseous and condensable oil fractions, thereby forming valuable vaporous effluents including gas, oil vapors, and superheated steam. Pyrolysis and vaporization of the carbonaceous matter in the oil shale leaves a particulate spent shale in the form of the spent mineral matrix matter of the oil shale and relatively small amounts of unvaporized or coked organic carbon-containing material. This retorting process more than 100 percent of Fischer Assay if the total usable products are added, that is, the gas, the oil, and deposition on the pellets in the heat carriers.

As the aforementioned vaporous effluents are formed, a combustible carbon-containing deposition or residue is formed or deposited on the controlled surface area of the pellets in the heat carriers. It has been found that the variables involved in this process as herein set forth may be related in a manner which aids in regulation of the amount of carbon-containing deposition thus deposited and at the same time make allowance for the fact that the original kerogen content of the raw shale feedstock and some other process conditions will intrinsically and periodically vary. The amount of deposition formed or deposited on the pellet portion of the heat carriers upon passage through the retort zone is sufficient upon combustion to provide at least 50 percent of the heat required to reheat the heat carriers and is preferably on an average less than 1.5 percent by weight of the heat carriers per pass through the retorting zone. The more preferred deposition range is between 0.8 and 1.5 percent. Basically, the amount of deposition on the heat carriers is important since as will hereinafter be shown this deposition is burned in a controlled manner to generate a major portion of the heat necessary for heating the heat carriers to carry out the retorting phase of the process. In addition to decreasing efficiency, excessive deposition increases greatly the possibility of overheating the pellets in the heat carriers and destroying or excessively altering their internal surface area. The total amount of deposition also affects the ultimate relative yields of gas and condensable or final liquefied products. This in turn affects the distribution of various boiling point fractions in the liquefied products. The amount of deposition deposited is basically controlled in this process by the interrelation of several variables, such as, heat carrier-to-shale ratio, the size and inlet temperature of the heat carriers, the retort temperature, the surface area of the pellets and of the entire heat carrier mixture. The surface area of the mixture is regulated by the proportion of low surface area bodies to the pellets and by the surface area of the pellets. Additional control over both the total amount of deposition deposited on the pellets may be obtained by residence time or throughput rate, partial or complete combustion of the deposition, controlled residue combustion time or amount of oxidizing gas used during burning, the catalytic characteristic of the pellets, and the size of the pores at the surface of the pellets. As can be readily seen by this description of the process, the degree of control provided by a single variable is never independent and the flexibility of control varies with the type of variable.

The average surface area of the combined heat bodies and pellets in the heat carriers is considered one of the most important variables. The test results of Tables 1, 2, and 3, which were obtained on pellets alone, illustrate the effect of surface area. The effect of pellet surface area on the amount of carbon-containing deposition formed on the pellets and on the distribution of carbon deposition between the pellets and spent shale is illustrated in Table 1. Table 2 illustrates the effect of pellet surface area on liquid product distribution when a modified Fischer retort was used. The effect of pellet-to-shale ratio and, therefore, total surface area of the pellets is illustrated in Table 3. The results illustrated in these tables lead to several conclusions. If the surface area is less than ten square meters per gram, either too little total deposition will be formed or the burning of the deposition will not be sufficient to provide a major portion of the heat required to heat the heat carriers to the desired temperature and to carry out the retorting phase of this process. This would necessitate the use of supplementary fuels and as indicated previously, this has significant disadvantages to the objects of this process. If the average surface area of the heat carriers exceeds 150 square meters per gram, too much total deposition will be formed.

In this invention the surface area of the heat carriers is regulated by blending the low surface area heat bodies with the high surface area pellets. The surface area of the heat bodies is far less than 0.1 square meters per gram of heat bodies and is for all practical purposes negligible. The proportion of pellets to low surface area heat bodies provides adjustment to the heat carrying capacity of the mixture to supply sufficient sensible heat to carry out the retorting phase of the process. Consequently, the mixture of heat bodies and pellets must contain at least 10 percent and less than 90 percent by weight of heat bodies to meet the requirements and functions of this invention. The mixture must also contain at least 10 percent and less than 90 percent by weight of pellets. By way of example, the total surface area of the pellets is determined by the surface area per gram of pellets and the total grams of pellets used. The total grams of pellets are controlled by the heat carrier-to-oil shale feedstock ratio, the fraction of the heat carriers that are pellets, and the shale throughput rate. If the pellets in the heat carriers have an average surface area of 200 square meters per gram, a fifty-fifty mixture of pellets and low surface area heat bodies will have an effective surface area of about 100 square meters per gram.

TABLE 1.—EFFECT OF PELLET SURFACE AREA ON CARBON DEPOSITION

| Pellet area, m.²/g. | Wt. percentage of carbon on— | |
|---|---|---|
| | Pellets | Residual shale |
| 28.0 | 0.725 | 3.90 |
| 28.5 | 0.89 | 3.65 |
| 29.0 | 0.93 | 3.95 |
| 32.5 | 0.94 | 3.71 |
| 46 | 1.24 | 3.49 |
| No pellets | | 4.30 |

TABLE 2.—EFFECT OF PELLET SURFACE AREA ON LIQUID PRODUCT DISTRIBUTION

| Product boiling range | No pellets | Pellet area* | |
|---|---|---|---|
| | | 47 m.²/g. | 96 m.²/g. |
| 150°–400° F | 12% | 27% | 34% |
| 400°–700° F | 37% | 46% | 48% |
| 700°–900° F | 32% | 22% | 14% |
| 900° F.+ | 19% | 5% | 4% |

*Pellet:Shale ratio=2:1

TABLE 3.—EFFECT OF PELLET:SHALE RATIO ON LIQUID PRODUCT DISTRIBUTION

| Product boiling range | No pellets | Pellet:shale ratio | | |
|---|---|---|---|---|
| | | 1:1 | 1.5:1 | 2:1 |
| 150°–400° F | 14% | 25% | 30% | 34% |
| 400°–700° F | 38% | 45% | 47% | 48% |
| 700°–900° F | 31% | 22% | 17% | 14% |
| 900° F.+ | 17% | 8% | 6% | 4% |

As illustrated in Tables 2 and 3, the surface area of the pellets and, therefore, the surface area of the heat carries affect liquid product distribution. Increasing the surface area of heat carriers tends to decrease the yield of condensable product vapors and increase production of gases. As a result, all variables being considered, it has been found that heat carrier surface areas between 10 and 150 square meters per gram are acceptable with surface areas between 10 and 100 square meters per gram being preferred and that heat carrier-to-shale ratios between one to three are preferred with ratios between 1.5 and 2.5 being more preferred.

As illustrated in Table 1, of particular additional significance is the fact that a substantial portion of the combustible deposition on the pellets comes from the residual carbonaceous material that would normally be left on the spent shale. In other words, the organic carbon material that is normally left on the spent shale divides itself between the pellets and the spent shale. This process, thereby, recovers residue that would normally be lost with the spent shale. The recovered residue is then made useful as fuel for heating the pellets. At first glance, this recovery may seem small, but when it is remembered that the organic content of the oil shale is small, it can be seen that this increased recovery and utility of the residue is quite significant.

The mixture of heat carriers and shale moves toward retort exit 17 and the gaseous and vaporous effluents containing the desired hydrocarbon values separate from the mixture. Since there is no need to use carrier, fluidizing, or retorting gases in the retort zone, the vaporous effluent is able to leave the retort essentially undiluted by extraneous fluids except for any water or steam vapor added to prevent or retard carbonization, or to sweep product vapors from the solids, or for other reasons to the retort or the effluent collection chamber. In a rotating retort system, the mixture movement is continuous and is aided by the action or design of this type of retort and by continuous withdrawing of heat carriers and spent shale from the exit end of the retort zone. If a rotating retort zone is used, caking or coking together of the heat carriers or spent shale will be kept low. Moreover, a rotating type of retort zone is especially suited to varying the residence time, that is, the length of time that the shale and heat carriers remain in the retort zone by allowing variations in heat carrier-to-shale ratio and volume of shale throughput. As previously indicated, greater than normal leeway in control over these variables is especially advantageous to regulation of the amount of deposition deposited on the pellets during the retort stage of the process. The residence time required is on the order of about three to about twenty minutes with residence times of less than twelve minutes for the heat carriers being preferred. The shale residence time depends on its flow or movement characteristics and since the shale is not uniform in size and shape, the shale residence time varies.

The mixture of heat carriers and spent shale exits from retort zone 13 at a temperature between 800° F. and 1150° F. by way of retort exit 17 into separation zone 19 for separation of the vapor, heat carriers, and spent shale. The separation zone may be any sort of exiting and separation system accomplishing the functions hereinafter mentioned and may be comprised of any number of units of equipment for separating and recovering one or more of these three classes of retort zone effluents either simultaneously, or in combination, or individually. In the process of this invention, it is highly desirable that at least 75 percent of the total spent shale be separated from the heat carriers in the separation zone to eventually be collected in separation zone exit line 21. In addition, at least 95 percent of the spent shale smaller than the heat carriers, that is, smaller than about 0.055 inch, are separated. As shown in FIG. 2, the retort zone mixture is first passed through revolving screen or trommel 23 which has openings or apertures sized to pass the heat carriers and spent shale of about the same or smaller size than the heat carriers. The trommel extends into product recovery chamber 25. In the trommel, the gaseous and vaporous products separate from the mixture of heat carriers and spent shale and, at the same time, large spent shale particles or agglomerates are separated from the heat carriers and spent shale. Spent shale and heat carriers flow through the openings in trommel 23 and drop to the bottom of recovery chamber 25 to exit via retort exit line 27. Any rocks or spent shale too large to pass through the openings in the trommel pass outward through exit 29. The product vapors and gases resulting from retorting the oil shale collect overhead in recovery chamber 25 and rapidly pass to overhead retort products line 31 at an exit temperature between about 750° F. and 1050° F. where the product vapors are subjected either in their vaporous or condensed state to hot dust separation (not shown) and passed to other stages (not shown) of the overall operation. The hot dust separation may be interior or exterior, or both, of recovery chamber 25 and the dust thus collected may be combined and handled with other spent shale. Hot dust or fines separation may be accomplished by hot gas cyclones, quenching and washing, agglomeration with sludge or a separately condensed heavy product fraction, centrifuging, filtration, or the like.

As mentioned previously, the gases produced in the retort zone need not be diluted by extraneous retort gases and are, therefore, readily used in the overall shale operation. Some gas may be needed for supplementary fuel and some for production in the usual manner of hydrogen if hydrogenation is used in the overall shale operation. The optimum amount of gas production is enough to satisfy these requirements as this process stresses liquid oil products.

As shown in FIG. 2, the spent shale and heat carriers in recovery chamber 25 are discharged via exit line 27 at a temperature between about 750° F. and 1050° F. where these particulate solids are passed or conducted by gravity or other means of conveyance to gas elutriation system 33 which is a part of separation zone 19. In the elutriation system, a major portion, and more preferably substantially all, of the remaining spent shale is separated from the heat carriers. It is essential that elutriation be accomplished in a way which retains the desired amount of combustible deposition deposited on the pellet portion of the heat carriers; consequently, the elutriating gas fed by line 35 is a noncombustion supporting gas. By conducting the process with heat carriers in the size range between about 0.055 inch and 0.5 inch, and preferably between 0.1 and 0.375 inch, at least 75 percent of the total spent shale may be separated by action of the trommel and subsequent gas elutriation at a velocity of between 18 and 25 feet per second if most of the raw shale feedstock was crushed to minus three-fourths inch. Based on an average of six sieve analyses of the spent shale produced by retorting half-inch shale feedstock in a rotating retort using ceramic one-half inch balls, about 16 percent by weight (analyses range 8% to 27%) of the spent shale is retained on a U.S. Sieve Series size 14 screen which is in a size range similar to the heat carriers. Gas elutriation with irregular or cylindrical shaped heat carriers only separates about 2.0 to 4.0 percent of this portion of the spent shale from the heat carriers. Therefore, on an average between 12 and 13 percent of the spent shale is difficult to separate by screening and elutriation depending on whether the heat carriers cover the entire size range of this part of the spent shale. As mentioned previously, retention of more than 25 percent of the spent shale interferes with proper operation of the pellet deposition burning zone even if most of the spent shale entering the burning zone is originally in the same size range as the heat carriers. Upon combustion, this spent shale would distintegrate further to fine ash and cause erratic operation of the combustion zone and other operating difficulties. In addition, some allowance is made for spent shale and ash buildup as the heat carriers are cycled and recycled through the process.

Since the spent shale having a size similar to the heat carriers is difficult to elutriate while the spent shale smaller than the heat carriers is readily separated by elutriation, and practically complete, it is desirable to alter the characteristics of the spent shale or of the heat carriers to accomplish a greater degree of separation while holding heat losses in the heat carriers to a reasonable level. One way to accomplish this objective is to crush at least 95 percent by weight of the shale feedstock to a minus 6 screen size. This results in a separation of at least 95 percent by weight of the total spent shale from the heat carriers and the trommel may also be eliminated. As mentioned previously, crushing to this size is costly and normally not done; however, in view of the fact that in this invention it is essential that the bulk of the spent shale be separated from the heat carriers prior to reheating of the heat carriers, the cost of additional crushing may be justified. Another way to accomplish the objective of this separation prior to reheating the heat carriers has been discovered. It has been found that if the heat carriers are essentially spherical, that is, have a sphericity factor of at least 0.9, the efficiency of separation by gas elutriation is greatly increased even if the raw shale is not crushed to a finer size. Spherical heat carriers have improved flow properties over the spent shale and for a given screen size particle exhibit greater weight per particle. Gas elutriation with spherical heat carriers will separate about 97 percent or more of the total spent shale retained on a U.S. Sieve Series size 14 screen and will provide almost complete separation of the smaller spent shale. Thus, if spherical heat carriers are used, gas elutriation will separate at least 95 percent of the total spent shale. As mentioned previously, therefore, the preferred shape of the heat carriers is spherical, that is, the preferred heat carriers have a sphericity factor of at least 0.9.

The separated spent shale is carried out of the elutriating chamber overhead through line 37 to dust cyclone 39 where the spent shale is collected and may be combined and handled with other spent shale for eventual compaction and waste disposal or sale for use in manufacturing other products.

The separated heat carriers with a combustible deposition deposited on the pellet portion thereof are then passed from the separation zone to a pellet deposition burning zone via heat carrier return line 41 to lifting system 43 where the heat carriers are lifted preferably to an elevation which allows gravity feed to retort zone 13 by way of lift line 45 to pellet deposition burning zone 47, which as shown in FIG. 2 has surge hopper 49 for collecting the lifted heat carriers and leveling out fluctuations and from which the heat carriers fall into combustion zone 51. While any conveying and lifting system holding heat losses to a reasonable value may be used, it is preferred as shown in FIG. 2 that the lifting system be a pneumatic conveying system which will operate in the conventional manner to lift the heat carriers to the pellet deposition burning zone. The lift gas enters the lift system via line 53 at a velocity between 25 and 70 feet per second and the lift time is, therefore, very short. As a result, air may be used as the lift gas without causing uncontrolled and appreciable combustion of the deposition on the pellet portion of the heat carriers and the detrimental effects attendant to such uncontrolled burning.

As mentioned previously, the pellet portion of the heat carriers bears a combustible carbon-containing deposition which was absorbed or deposited during retorting of the oil shale. This combustible deposition is burned in combustible pellet deposition burning zone 47 to provide at least 50 percent or more of the heat required to reheat the heat carriers to the temperature required to effect retorting of the shale. The combustible deposition is burned in a manner similar to the way that catalytic cracking catalysts particles are regenerated and which would excessively reduce the combined effective surface area of the heat carriers to less than ten square meters per gram. A progressive bed burner with a gas flow of about one to two feet per second is preferred. A combustion supporting gas, for example air, a mixture of air and fuel gas generated in the process, flue gas with the desired amount of free oxygen, is blown into the pellet deposition burning zone at a temperature at which the deposition on the pellets in the heat carriers is ignited by way of combustion gas inlet 55 which in FIG. 2 includes a blower. Steam may also be used to control burning provided that the steam does not excessively reduce the surface area of the pellets in the heat carriers. The combustion supporting gas may be preheated in heaters 57 by burning some of the gases produced in the process to reheat the heat carriers to the minimum ignition temperature. The quantity of combustion supporting gas, e.g. about ten to fifteen pounds of air per pound of deposition, affects the total amount of deposition burned and the heat generated by such burning and in turn the temperature of the heat carriers. The bulk density and specific heat of the heat carriers will vary and will, of course, depend on the materials used to form the heat carrier mixture. The gross heating value of the carbon-containing deposition is estimated to be about 15,000 to 18,000 B.t.u. per pound. The amounts of carbon dioxide and carbon monoxide produced in the flue gases created by burning the deposition indicate amount of combustion supporting gas required or used and the amount of carbon-containing deposition not burned. Generally, it is desirable to attempt to burn all of the deposition on the pellets. In any case, as a general rule, at least fifty percent of the deposition is burned.

The unburned deposition is returned to the retort zone with the heat carriers. In this manner, the total amount of carbon-containing deposition deposited per cycle on the heat carriers is also regulated to some degree. It should be noted that this type of controlled burning does not selectively burn the same amount of deposition from every pellet. Other factors taken into consideration during burning of this deposition are the heat carrier porosity, density, and size, the burner chamber size and heat carrier bed size, residence burning time, the desired temperature for the heat carriers, heat losses and inputs, the heat carrier and oil shale feed rates to the retort zone, and the like. The residence burning time will usually be rather long and up to about thirty to forty minutes. Combustion of the deposition should be controlled in a manner which does not heat the heat carriers to above 1400° F. The hot flue gases generated in the pellet deposition burning zone may be removed by burning zone exit line 59 and used to preheat cool raw shale feedstock or for heat transfer to any other phase or part of the shale operation. For example, this stream could be fed to a carbon monoxide boiler and the heat available from the boiler could be used for processing product vapors or to drive turbines. Of course, additional fuel material or gases may be used to supplement burning of the combustible pellet deposition if this is necessary, but it is to be understood that burning of the deposition on the pellet portion supplies the major portion of the sensible heat required for retorting of the shale and that the variables are set to accomplish this objective along with the other advantages and objectives of this process.

A continuous stream of hot heat carriers having a temperature between 1000° F. and 1400° F. is thereby produced for return and introduction back through heat carrier inlet pipe 15 into retort zone 13. As previously indicated, the rate of return of the heat carriers will be metered or controlled in conventional manners to correspond to the crushed raw oil shale feed rate, the organic content of the raw oil shale, the optimum heat carrier-to-oil shale feedstock ratio, the desired distribution of products, and to the other variables previously described.

Although the retorting process is carried out in a manner to hold loss of pellets and other heat carriers to a minimum, some will be lost in the process and a relatively small quantity of pellets or other heat carriers may be added continuously to maintain the desired quantity of heat carriers.

The foregoing description of the conditions and variables of the process illustrates a preferred method of conducting a retorting process. Reasonable variations and modifications are practical within the scope of this disclosure without departing from the spirit and scope of the claims of this invention. For example, while the disclosure of this process and the variables have been limited to oil shale, the process concepts lend themselves readily to retorting of any solid organic carbonaceous material containing hydrocarbon values which can be recovered by thermal vaporization of the solid carbonaceous material, such as, for example, coal, peat, and tar sands. By way of further example, while only a single train of units and stages have been described, it is to be understood that any stage or zone could be comprised of more than one stage or zone, each of which could be operated under different conditions to provide the overall combined effect set forth.

The embodiments of the invention in which an exclusive property or privilege is claimed are defined as follows:

1. In a method for retorting crushed oil shale containing carbonaceous organic matter and mineral matter wherein oil shale is retorted by contacting said oil shale with particulate hot heat carriers in a retort zone to gas and oil products, particulate spent shale, and an organic combustible deposition on at least a portion of said heat carriers, said heat carriers having been heated in a deposition burning zone to a retort zone inlet temperature of between 1000° F. and 1400° F. mainly by combustion of a combustible carbon-containing deposition on said heat carriers, said heat carriers being in an amount sufficient to provide at least 50 percent of the heat required to vaporize a major portion of the carbonaceous matter from said oil shale and to heat said crushed oil shale from its retort zone inlet temperature to a retort zone outlet temperature of between 800° F. and 1150° F., and wherein said gas and oil producs are separated and recovered, the improvement wherein said heat carriers are comprised of particulate heat bodies and pellets in a size range between about 0.055 inch and 0.5 inch, said heat bodies having a low surface area less than 0.1 square meter per gram of said heat bodies, said pellets having a relatively high surface area at least as great as 20 square meters per gram of said pellets, said heat carriers containing between 10 and 90 percent by weight of said heat bodies and between 90 and 10 percent by weight of said pellets, and the combined average surface area of said heat bodies and said pellets in said heat carriers being between 10 and 150 square meters per gram.

2. The method according to claim 1 wherein the pellets are in a size range between about 0.055 inch and 0.375 inch.

3. The method according to claim 1 wherein at least 75 percent by weight of the total of said spent shale and at least 95 percent by weight of the portion of said spent shale that is smaller in size than said heat carriers is separated in a separation zone from said heat carriers after retorting of said oil shale but prior to said heating of said heat carriers by combustion of said deposition on said heat carriers.

4. The method according to claim 1 wherein the amount of said heat carriers is such that the ratio of said heat carriers to said crushed oil shale in said retort zone on a weight basis is between one and three.

5. The method according to claim 4 wherein at least 75 percent by weight of the total of said spent shale and at least 95 percent by weight of the portion of said spent shale that is smaller in size than said heat carriers is separated in a separation zone from said heat carriers after retorting of said oil shale but prior to said heating of said heat carriers by combustion of said deposition on said heat carriers.

6. A method for retorting of crushed oil shale containing carbonaceous organic matter and mineral matter comprising:

(a) feeding crushed oil shale and heat carriers to a retort zone, said heat carriers being comprised chiefly of particulate heat bodies and pellets in a size range between about 0.055 inch and 0.5 inch, said heat bodies having a low surface area less than 0.1 square meter per gram of said heat bodies, said pellets having a relatively high surface area at least as great as 20 square meters per gram of said pellets, said heat carriers containing between 10 and 90 percent by weight of said heat bodies and between 90 and 10 percent by weight of said pellets, the combined average surface area of said heat bodies and said pellets in said heat carriers being between 10 and 150 square meters per gram, said heat carriers being at a retort zone inlet temperature between 1000° F. and 1400° F. and in a quantity such that the ratio of said heat carriers to said crushed oil shale entering said retort zone on a weight basis is between one and three, said ratio also being such that the sensible heat in said heat carriers is sufficient to provide at least 50 percent of the heat required to heat said crushed oil shale from its retort zone feed temperature to a retort zone outlet temperature of between 800° F. and 1150° F.;

(b) retorting in said retort zone gas and oil products from said crushed oil shale, thereby forming particulate spent shale and a combustible deposition on said pellets in said heat carriers;

(c) causing said heat carriers and said spent shale to pass from said retort zone to a particle separation zone and separating from said heat carriers at least 75 percent by weight of the total spent shale and at least 95 percent by weight of the portion of said spent shale that is smaller in size than said heat carriers prior to heating said heat carriers in a combustible deposition burning zone;

(d) recovering gas and oil products generated by retorting of said crushed oil shale;

(e) passing said heat carriers from said separation zone to said combustible deposition burning zone;

(f) heating said heat carriers passed to said combustible deposition burning zone to an outlet temperature of between 1000° F. and 1400° F. by burning the combustible carbon-containing deposition on said pellets with a combustion supporting gas; and (g) thereafter passing said heated heat carriers from said combustible deposition burning zone to said retort zone.

7. The method according to claim 6 wherein the pellets are in a size range between about 0.055 inch and 0.375 inch.

8. The method according to claim 6 wherein the average amount of said combustible carbon-containing deposition formed on said pellets in said heat carriers upon passage through said retort zone is on said average less than 1.5 percent by weight of said heat carriers.

9. The method according to claim 8 wherein said heat carriers have a sphericity factor of at least 0.9.

10. The method according to claim 6 wherein the separation of step (c) is comprised of first passing said heat carriers and said spent shale through apertures in a trommel to screen out at least a portion of the spent shale and any agglomerates larger than said heat carriers, and thereafter subjecting the remaining heat carriers and spent shale to gas elutriation with a noncombustion supporting gas to effect further separation of the spent shale from the heat carriers.

11. The method according to claim 10 wherein the average amount of said combustible carbon-containing deposition formed on said pellets in said heat carriers upon passage through said retort zone is on said average less than 1.5 percent by weight of said heat carriers.

12. The method according to claim 6 wherein said heat carriers have a sphericity factor of at least 0.9 and at least 95 percent by weight of the total spent shale is separated from said heat carriers in step (c).

13. The method according to claim 12 wherein the average amount of said combustible carbon-containing deposition formed on said pellets in said heat carriers upon passage through said retort zone is on said average less than 1.5 percent by weight of said heat carriers.

14. The method according to claim 6 wherein at least 95 percent by weight of the crushed oil shale of step (a) has been crushed to a size to pass through a U.S. Sieve Series size 6 screen and at least 95 percent by weight of the total spent shale is separated from said heat carriers in step (c).

15. The method according to claim 14 wherein the average amount of said combustible carbon-containing deposition formed on said pellets in said heat carriers upon passage through said retort zone is on said average less than 1.5 percent by weight of said heat carriers.

16. The method according to claim 6 wherein the combined average surface area of said heat bodies and said pellets in said heat carriers is between 10 and 100 square meters per gram.

17. The method according to claim 16 wherein the pellets are in a size range between about 0.055 inch and 0.375 inch.

18. The method according to claim 16 wherein the average amount of said combustible carbon-containing deposition formed on said pellets in said heat carriers upon passage through said retort zone is on said average less than 1.5 percent by weight of said heat carriers.

19. The method according to claim 18 wherein said heat carriers have a sphericity factor of at least 0.9.

20. The method according to claim 16 wherein the separation of step (c) is comprised of first passing said heat carriers and said spent shale through apertures in a trommel to screen out at least a portion of the spent shale and any agglomerates larger than said heat carriers, and thereafter subjecting the remaining heat carriers and spent shale to gas elutriation with a noncombustion supporting gas to effect further separation of the spent shale from the heat carriers.

21. The method according to claim 20 wherein the average amount of said combustible carbon-containing deposition formed on said pellets in said heat carriers upon passage through said retort zone is on said average less than 1.5 percent by weight of said heat carriers.

22. The method according to claim 16 wherein said heat carriers have a sphericity factor of at least 0.9 and at least 95 percent by weight of the total spent shale is separated from said heat carriers in step (c).

23. The method according to claim 22 wherein the average amount of said combustible carbon-containing deposition formed on said pellets in said heat carriers upon passage through said retort zone is on said average less than 1.5 percent by weight of said heat carriers.

24. The method according to claim 16 wherein at least 95 percent by weight of the crushed oil shale of step (a) has been crushed to a size to pass through a U.S. Sieve Series size 6 screen and at least 95 percent by weight of the total spent shale is separated from said heat carriers in step (c).

25. The method according to claim 24 wherein the average amount of said combustible carbon-containing deposition formed on said pellets in said heat carriers upon passage through said retort zone is on said average less than 1.5 percent by weight of said heat carriers.

References Cited
UNITED STATES PATENTS

| | | | |
|---|---|---|---|
| 3,008,894 | 11/1961 | Culbertson | 208—11 |
| 3,018,243 | 1/1962 | Nevens | 208—11 |
| 3,020,227 | 2/1962 | Nevens et al. | 208—11 |
| 3,058,903 | 10/1962 | Otis | 208—11 |
| 3,252,886 | 5/1966 | Crawford | 208—11 |
| 3,573,197 | 3/1971 | Gessner | 208—11 |
| 3,803,021 | 4/1974 | Abdul-Rahman | 208—11 |
| 3,803,022 | 4/1974 | Abdul-Rahman | 208—11 |

CURTIS R. DAVIS, Primary Examiner